Figure 1:
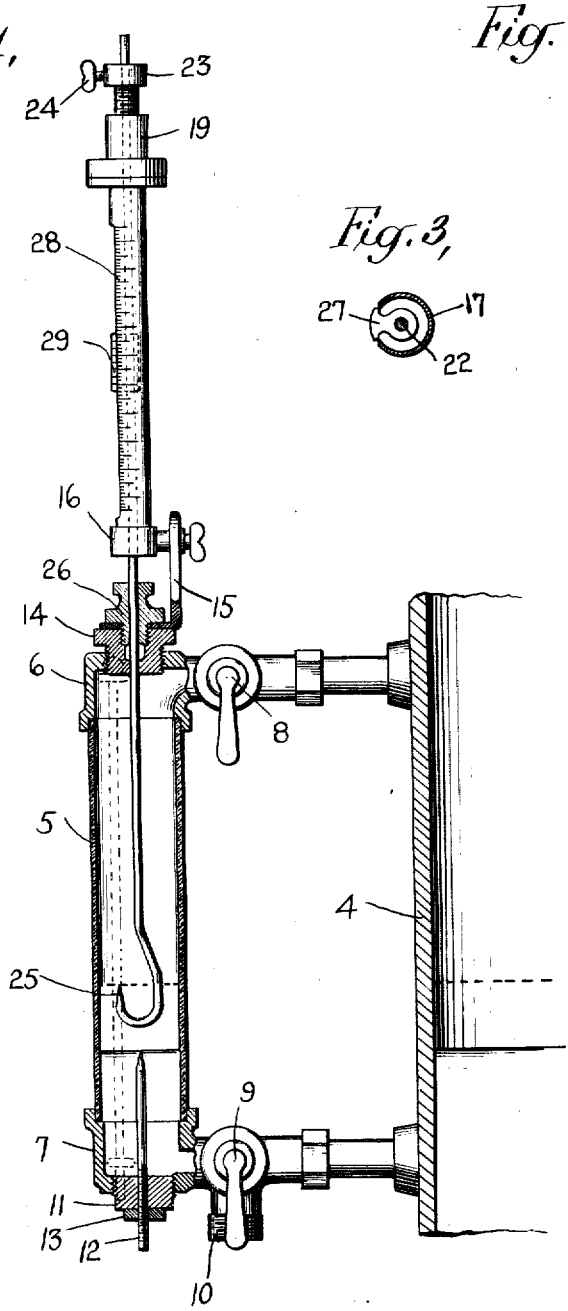

E. G. JAY, Jr.
MEASURING INSTRUMENT.
APPLICATION FILED OCT. 11, 1913.

1,150,600.

Patented Aug. 17, 1915.

WITNESSES
J. McIntosh
M. S. Jay

INVENTOR
Edward G. Jay, Jr.
BY
Edmonds & Edmonds
ATTORNEYS

UNITED STATES PATENT OFFICE.

EDWARD G. JAY, JR., OF PHILADELPHIA, PENNSYLVANIA, ASSIGNOR TO HARRISON SAFETY BOILER WORKS, OF PHILADELPHIA, PENNSYLVANIA, A CORPORATION OF PENNSYLVANIA.

MEASURING INSTRUMENT.

1,150,600.  Specification of Letters Patent.  Patented Aug. 17, 1915.

Application filed October 11, 1913. Serial No. 794,539.

*To all whom it may concern:*

Be it known that I, EDWARD G. JAY, Jr., a citizen of the United States, residing in Philadelphia, in the county of Philadelphia and State of Pennsylvania, have invented certain new and useful Improvements in Measuring Instruments, of which the following is a specification.

This invention relates to measuring instruments for measuring the head of a liquid either at rest in a receptacle or flowing from one level to another.

An instrument constructed in accordance with the invention is of use in a great variety of ways. It is of special utility in measuring the volume of water in a tank or the flow of water over a weir which water is to be supplied to steam generating apparatus so that the efficiency of such apparatus or the plant in which it is employed may be accurately determined. The instrument is so constructed as to permit of measuring the level of a body of water with reference to a fixed datum or zero line so that the height of the liquid above this fixed line may be used in connection with the dimensions of the receptacle for the water or in connection with a formula for the flow of water over a known weir to obtain the desired information with respect to the volume of the water.

The features of the invention are preferably, though not necessarily, employed in a measuring instrument constructed for use in connection with a water gage of the type now in common use consisting of a glass tube connected at its ends to a receptacle for the water to be measured at points above and below the normal level of the water in the receptacle. When so employed, the instrument includes an element adapted to be adjusted vertically within the gage tube to a position corresponding exactly with the level of the water in the tube and the instrument is so constructed that when this element has been properly adjusted an accurate reading may be made of its position with reference to a fixed datum line. With readings thus obtained, it is possible to calculate exactly the volume of water in a tank to which the instrument is connected or the rate of flow of water from one level to another through a notch of known dimensions in a weir.

The principles of my invention will be understood by reference to the following description taken in connection with the accompanying drawings. These drawings show the embodiment of my invention which I prefer to employ, but it will be understood that the features of my invention may be employed in instruments differing widely in construction from that illustrated to better adapt them for the particular uses for which they are devised.

Figure 3:
Figure 2:
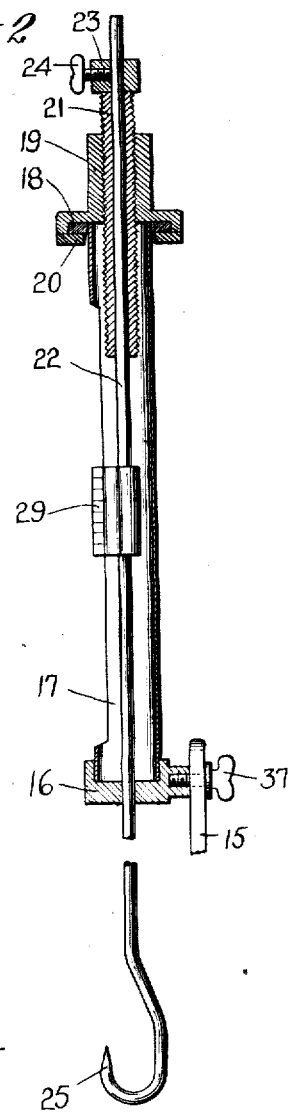

In these drawings, Figure 1 is an elevation of my improved measuring instrument applied to a water gage connected to a tank, the gage and tank being shown partly in section, Fig. 2 is a vertical section of the instrument and Fig. 3 is a horizontal section through the tubular member of the instrument.

Referring to these drawings, a receptacle for water is shown diagrammatically at 4 in Fig. 1. This may be the water-chamber of a feed-water heater or a storage reservoir connected thereto or any other form of container for water in which the level of the water varies from time to time. The tank may be arranged for withdrawal of the water from the bottom thereof in which case the instrument could be used for measuring the quantity of water in the tank or it may be a tank from which the water flows over a weir in which case the instrument could be employed for ascertaining not only the volume of water in the tank but also the rate of flow of the water over the weir.

A water gage 5 is connected to the tank 4 in the usual manner. This gage consists of a glass tube and fittings 6 and 7 connecting the upper and lower ends of the tube 5 to the tank 4 above and below the normal or low level of the water in the tank, respectively. The fitting 6 is provided with a cock 8 by which the upper end of the gage may be connected to or disconnected from the tank. The lower fitting 7 is provided with a three-way cock 9 which may be employed to close or open the passageway through the fitting 7 from the tank to the gage and to close or open an outlet 10 for changing the level of the water within the tank and gage. The fitting 7 has a threaded opening therein concentric with tube 5 which opening receives a removable plug 11. This plug has a central opening which receives a pointer or index 12 made of round wire tapered to a point at its upper end. The index 12 is mounted in the plug 11 and may be locked in any adjusted position with reference to plug 11 by means of a lock-nut 13. The fitting 6 has a threaded opening therein concentric with tube 5 which receives a removable plug. In order to employ my improved measuring instrument, the plug in this opening in fitting 6 is removed and in its place is substituted a plug 14 on which the parts of the measuring instrument proper are mounted.

The plug 14 formed for insertion in the opening in fitting 6 is enlarged at its upper end and has a slotted bracket 15 secured thereto. To this bracket a block or casing 16 is adjustably secured by means of a wing-nut 37. The casing 16 has a circular depression in its upper face which receives the lower end of a tubular member 17 whose upper end is secured to a ring 18. This ring coacts with a nut 19 to secure the nut to the tube 17 while permitting relative rotation of these parts. For this purpose, the lower end of nut 19 is formed to extend partially around the ring 18 and it has a ring 20 secured to its lower end and projecting inwardly under the ring 18. The nut 19 has a threaded opening therethrough which receives a threaded tube 21. This tube 21 has a central opening therein through which passes a rod 22. On the upper end of this rod a collar 23 is secured by means of a wing-nut 24. This collar normally rests upon the upper end of tube 21 and it may be secured to the tube if desired. The rod 22 extends downwardly through an opening in the casing 18 and an opening in the plug 14 and its lower end is bent to form a hook as shown, the extreme end being tapered to a point at 25. The rod 22 is movable vertically through its opening plug 14 and as the instrument is sometimes used in connection with tanks carrying a pressure in excess of atmospheric, I prefer to provide a stuffing-box as shown at 26 to guard against loss of pressure by leakage through plug 14 around rod 22.

The tube 17 is slotted on one side as shown to provide for movement of a member 27 mounted upon the rod 22. On the outer surface of the tube 17 are scale markings as shown at 28 in Fig. 1. The outer surface of the member 27 is also provided with scale markings 29 so arranged that they constitute a vernier with reference to the scale markings 28.

With the instrument attached to any form of container for a liquid in any suitable manner, such for instance as that indicated in Fig. 1, a zero or datum line is established by setting the index 12 so that its point is exactly at the surface of the liquid when the liquid in the container is at the normal or a certain selected level. Preferably the hook gage is then so adjusted that the point 25 of the gage is also exactly at the level of the point of the index 12. The vernier 29 will then stand at the zero position with reference to the scale 28. Any rise of the level of the water in the container above the zero line may then be readily measured. Suppose that the water rises to the level indicated by the dotted line on Fig. 1. In order to measure the extent of this rise, the operator turns the nut 19 and this, by reason of its threaded connection to the tube 21, causes the tube to move vertically upward carrying with it the rod 22 and vernier 29. The upward movement of these parts is continued until the point 25 of the rod 22 is brought exactly to the surface of the water in the tube 5. This, having been done, a reading is made by reference to the scales 28 and 29. This reading can be made with great accuracy because of the provision of the vernier 29. Readings can thus be made readily and accurately of changes of the level of the liquid in tank 4 and tube 5. It will be noted that the provision of the set screw 24 and collar 23 permits of making quickly a change in the vertical position of hook 25 of unusual magnitude, thus saving a substantial portion of the time which would be required to effect such a change by turning the nut 19. With an instrument thus constructed, measurements can readily be made of changes in the level of the water in a tank in order to ascertain the volume of water in the tank at different times.

The instrument is of special utility in measuring the amount of water supplied to steam generating apparatus, as for instance, water supplied to such apparatus from an open type feed-water heater. In such a system, it is common to provide a V-notch weir over which the water flows and with an instrument of the character herein described, measurements may be readily made of the level of the water with respect to the notch in the weir so that by reference to a previously prepared table the rate of flow of the water over the weir may be readily determined.

Having described my invention, what I claim as new therein and desire to secure by Letters Patent of the United States is:

1. In devices for measuring the head of a liquid, the combination of a container for a liquid, a tube mounted thereon, and provided with an index scale, a hook-gage-rod extending from said tube into the container, and adapted to have its pointed hook-end brought into the surface plane of liquid in the container, a pointer on the rod, adapted to coact with said scale, and manually movable means, including a pair of coacting threaded members, for moving said rod to position its end in the surface plane of the liquid, and support the same in such position, substantially as set forth.

2. In devices for measuring the head of a liquid, the combination of a container for a liquid, a tube mounted thereon, a gage-rod having a pointed end extending from said tube into the container, and adapted to have its pointed end brought into the surface plane of liquid in the container, manually movable means, comprising a nut rotatively mounted on said tube and restrained from vertically rising thereon beyond a fixed position, and coacting threaded means, for precisely adjusting the vertical position of said rod to position the end thereof in the surface plane of said liquid, and means for indicating the position of said rod, substantially as set forth.

3. In devices for measuring the head of a liquid, the combination of a container for a liquid, a manually rotatable member mounted in a vertically fixed position relative to the container and having a threaded opening therethrough, a tubular member exteriorly threaded extending through said opening and coacting with the thread thereof, a gage rod passing through the opening in said tubular member and extended to enter the container and means manually adjustable from the exterior of the device for positioning the rod with respect to the tubular member, substantially as set forth.

4. In devices for measuring the head of a liquid, the combination with a water gage of a frame mounted thereon having an abutment, a gage rod extending through the top of said water gage and having an end adapted to be positioned in the surface plane of water in the gage, and means, comprising a nut rotatably mounted on the frame and coacting with said abutment, for precisely adjusting the vertical position of said rod, substantially as set forth.

5. A measuring instrument comprising a base having an opening therethrough, a tubular member mounted on the base and cut away on one side, a nut rotatably mounted on the tubular member, an exteriorly threaded tube passing through the nut, a rod passing through the tube, tubular member and base, and means for positioning the rod relatively to the tube, and causing said rod to rise with said tube when the latter is actuated by said nut, said tubular member and rod being provided with scale markings, substantially as set forth.

6. In devices for measuring the head of a liquid, the combination with a water gage, of a frame mounted thereon having an abutment, a gage rod extending through the top of said water gage and having an end adapted to be positioned in the surface plane of water in the gage, an exteriorly threaded sleeve surrounding said rod, a loose collar on said rod above said sleeve, means for detachably securing said collar to said rod, and a rotatable nut mounted to coact with said abutment, and threaded upon said sleeve, substantially as set forth.

7. In devices for measuring the head of a liquid, the combination with a water gage, of a gage rod extending through the top of said water gage and having an end adapted to be positioned in the surface plane of water in the gage, rotative means for precisely adjusting the vertical position of said rod, and securing means operable to place said rod under the control of said rotating means, or to permit speedy adjustment of the vertical position of said rod, independently of said rotative means, substantially as set forth.

This specification signed and witnessed this 10th day of October, 1913.

EDWARD G. JAY, Jr.

Witnesses:
 WILBERT SAILER,
 ROBERT G. CLIFTON.

It is hereby certified that the assignee in Letters Patent No. 1,150,600, granted August 17, 1915, upon the application of Edward G. Jay, Jr., of Philadelphia, Pennsylvania, for an improvement in "Measuring Instruments," was erroneously described and specified as "Harrison Safety Boiler Works, of Philadelphia, Pennsylvania, a corporation of Pennsylvania," whereas said assignee should have been described and specified as *a copartnership of Pennsylvania;* page 2, of the printed specification, line 41, before the word "plug" insert the word *in;* and that the said Letters Patent should be read with these corrections therein that the same may conform to the record of the case in the Patent Office.

Signed and sealed this 21st day of September, A. D., 1915.

[SEAL.]
J. T. NEWTON,
*Acting Commissioner of Patents.*